United States Patent [19]

Morris

[11] Patent Number: 4,884,399
[45] Date of Patent: Dec. 5, 1989

[54] EXHAUST SYSTEM FOR REAR-ENGINE VEHICLES

[76] Inventor: James K. Morris, 7004 S. 12th, #2106, Tacoma, Wash. 98465

[21] Appl. No.: 315,397

[22] Filed: Feb. 24, 1989

[51] Int. Cl.$^4$ ............................................... F01N 7/10
[52] U.S. Cl. .................................... 60/313; 180/892; 180/296; 180/309
[58] Field of Search .................... 60/312, 313, 323; 180/89.2, 296, 309

[56] References Cited

U.S. PATENT DOCUMENTS 4,799,565  1/1989  Handa ................................. 180/309

FOREIGN PATENT DOCUMENTS 1025906  6/1983  U.S.S.R. .............................. 60/313

Primary Examiner—Douglas Hart
Attorney, Agent, or Firm—Christensen, O'Connor, Johnson & Kindness

[57] ABSTRACT

An exhaust system (10) for a V-8 engine (14) mounted in a Porsche automobile (12) having a transaxle (16) with articulated axles (18). The exhaust system (10) comprises a pair of tubular headers (24) connected to an exhaust pipe (26) that extends over, around, and back under the transaxle (16) and is connected to a pair of reverse-flow mufflers (30). A balance tube (56) passes through a relieved portion (58) formed in the oil pan (22) of the V-8 engine to connect the exhaust pipes (26).

9 Claims, 1 Drawing Sheet

EXHAUST SYSTEM FOR REAR-ENGINE VEHICLES

TECHNICAL FIELD

The present invention pertains to automotive exhaust systems and, more particularly, to a balanced dual-exhaust system for rear-engine automobiles having a V-8 engine coupled to a combination transmission and drive axle.

BACKGROUND OF THE INVENTION

Automotive internal combustion engines utilize exhaust systems for directing burnt gases out of the engine cylinders and for dampening exhaust noises. Factory-installed exhaust systems typically include an exhaust manifold, an exhaust pipe extending from the exhaust manifold to the rear of the vehicle, a muffler coupled to the end of the exhaust pipe, and a tailpipe extending from the muffler to outside the vehicle. Exhaust manifolds formed of thick cast iron and high-restriction mufflers are installed at the factory to achieve substantial sound dampening. The drawback to these manifolds and mufflers is that they severely impair the flow of exhaust gases, which greatly reduces the power output of the engine, and add weight, which decreases performance and increases gas consumption.

To increase engine efficiency and performance, the exhaust system can be replaced with commercially available low-restriction manifolds and mufflers that more effectively exhaust burnt gases without significantly increasing the exhaust noise. Low-restriction manifolds, typically referred to as "headers", have equal length, lightweight, large diameter tubes tuned to a predetermined resonant frequency that scavenge the burnt gases from the engine with a high amount of efficiency. In addition, these headers maintain exhaust noise at a minimum level and cool the engine by quickly dissipating heat. Low-restriction mufflers further reduce back pressure while producing a pleasing sound. To further reduce back pressure and lower exhaust noises, it has been found that a balance tube installed between the two exhaust pipes on a V-8 engine will balance out the flow of burnt gases and dampen low-frequency sound pulses.

Owners of some foreign cars have found it desirable to exchange the heavy, low-performance foreign engine for a lighter, high-performance American engine. A popular exchange is a domestic V-8 engine, such as a small-block Chevrolet engine, into a foreign sports car, such as a 911 S Porsche automobile. Because these engine exchanges are not done on a large scale, preformed exhaust systems for these engine-body combinations are not commercially available. As a result, the exhaust system must be custom-fabricated. Because foreign automobiles are not designed to accept domestic engines, a number of difficulties are encountered in fabricating the exhaust system. For instance, because a V-8 engine mounted in the 911 S Porsche faces rearward, the exhaust manifold will direct the exhaust gases in a forward direction. Furthermore, the combination transmission and drive axle, commonly referred to as a "transaxle", interferes with the routing of exhaust pipes and prevents the use of headers and balance tubes. As a result, the exhaust system must be configured to curve ahead of the transaxle to redirect the exhaust gases toward the rear of the automobile. Consequently, the exhaust system on these engine exchanges uses a complex arrangement of exhaust pipes without the benefit of headers and balance tubes that results in a loud sound with poor performance from the engine.

SUMMARY OF THE INVENTION

The present invention is directed to a low-restriction exhaust system for a rear-engine automobile having a rearward-facing engine coupled to a transaxle. The exhaust system comprises one or more exhaust manifolds adapted to be mounted on the engine and configured to direct engine exhaust gases toward the front of the automobile; one or more exhaust pipes coupled at one end to the one or more exhaust manifolds, the one or more exhaust pipes extending in a forward direction over the transaxle to curve around the transaxle and extend in a rearward direction; and one or more mufflers coupled to the other end of each of the one or more exhaust pipes for silencing exhaust noises.

In accordance with another aspect of the invention, the invention comprises a balanced dual-exhaust system for a V-8 engine mounted within a 911 S Porsche automobile. The system includes a first exhaust manifold adapted to be mounted to the V-8 engine over one bank of exhaust ports and configured to direct the flow of exhaust gases in a forward direction; a second manifold adapted to be mounted to the V-8 engine over one bank of exahust ports and configured to direct the flow of exhaust gases in a forward direction; and a first exhaust pipe coupled to the first exhaust manifold, and a second exhaust pipe coupled to the second exhaust manifold, the first and second exhaust pipes extending forward from their respective exhaust manifolds and over the transaxle, then curving down and around the transaxle to extend in a rearward direction. One or more mufflers are coupled to each of the exhaust pipes. The system further comprises a balanced tube connected between the first and second exhaust pipes and located immediately ahead of the mufflers. The balance tube preferably extends transversely below the engine through a relief formed in the oil pan of the engine.

In accordance with another aspect of the present invention, the exhaust manifolds comprise lightweight, tubular pipes of equal length to provide low restriction to the flow of exhaust gases.

In accordance with another aspect of the present invention, the mufflers are preferably formed of reverse-flow, low-restriction mufflers, with a pair of such mufflers being attached to each exhaust pipe.

In accordance with a further aspect of the present invention, the tubular pipes of each manifold empty into a single collector to which an exhaust pipe is coupled.

As will be readily appreciated from the foregoing description, the exhaust system provides a simple, lightweight, and efficient conductor for the flow of exhaust gases from the engine to the exterior of the car. The configuration of exhaust pipes to extend over and around the transaxle permits the use of tubular headers to increase the power of the engine. In addition, the modification to the oil pan to permit the transverse extension of the balance tube below the engine between the two exhaust pipes further reduces back pressure and exhaust noises while avoiding interference with the transaxle and related mounting and adjusting components. With this exhaust system, the full power of the domestic V-8 engine can be quietly and efficiently developed and used.

BRIEF DESCRIPTION OF THE DRAWINGS

The foregoing and other features of the invention will be more readily appreciated as the same becomes better understood by reference to the following detailed description when taken in conjunction with the accompanying drawings wherein.

DETAILED DESCRIPTION OF THE PREFERRED EMBODIMENT

Figure 1:
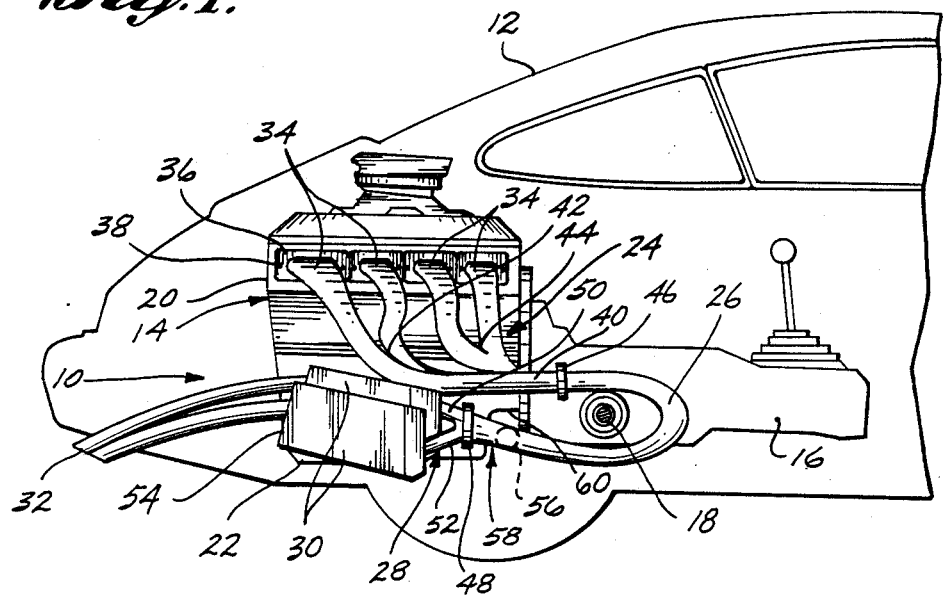
FIG. 1 is a side view of an exhaust system formed in accordance with the present invention as installed on a V-8 engine mounted in a Porsche 911 S automobile.
Figure 2:
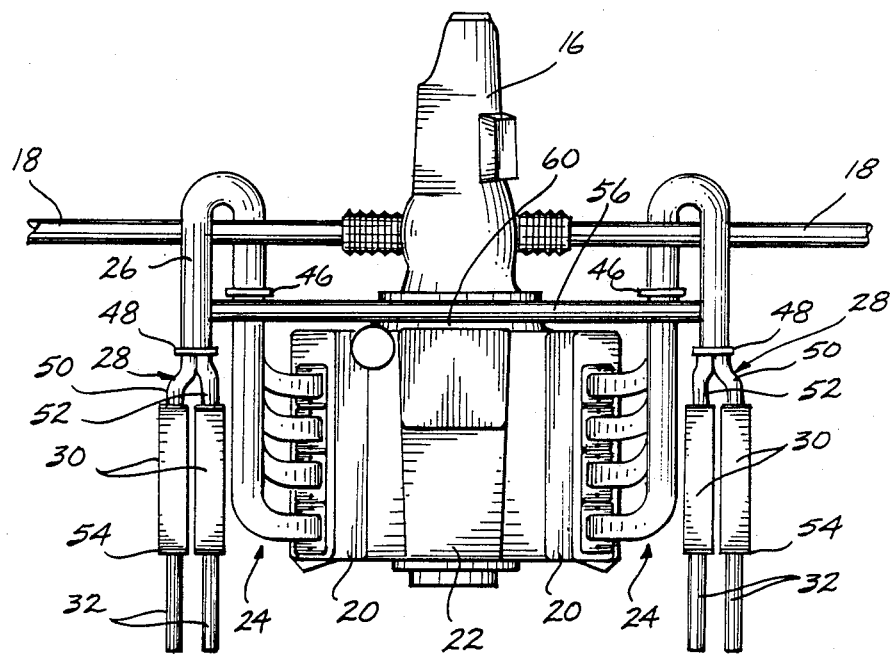
FIG. 2 is a bottom view of the exhaust system of FIG. 1 formed in accordance with the present invention.

FIGS. 1 and 2 illustrate a representative embodiment of an exhaust system 10 formed in accordance with the present invention as mounted in a Porsche 911 S automobile 12. The exhaust system 10 is installed on a small-block Chevrolet V-8 engine 14 mounted to face rearward in the automobile 12 and coupled to a combination transmission and drive axle, referred to herein as a transaxle 16. The transaxle 16 includes a Porsche 915 five-speed transmission having a pair of articulated axles 18 projecting therefrom that individually move up and down. The engine 14 is a 350-cubic-inch displacement Chevrolet engine, preferably constructed of aluminum alloy, generally referred to as a Donovan engine that is available from Donovan Engines, located in Torrance, Calif. The engine 14 is a V configuration having two banks of cylinders with heads 20 mounted over each bank. Each head 20 has four exhaust ports (not shown) that open to the outside of the engine 14. An oil pan 22 is attached to the bottom of the engine 14 for storing lubricating oil. The various mounting components necessary to install the V-8 engine 14 in the automobile 12 can be obtained from Renegade Hybrids, located in Whittier, Calif., which sells a conversion kit for the 911 S V-8 engine, identified as Model No. 77.911 S.

In the representative embodiment, the exhaust system 10 is a dual system comprising a pair of lightweight tubular exhaust manifolds or headers 24, a pair of exhaust pipes 26, a pair of Y connectors 28, two pairs of mufflers 30, and two pairs of tailpipes 32. Although various hangers, connectors, and straps that are used to support the exhaust system 10 in the automobile 12 are not shown, it is to be understood that they will be used as needed.

The headers 24 are constructed of four lightweight tubular pipes or tubes 34 that are constructed to have an equal length. One end of each tube 34 is connected to the head 20 over an exhaust port by means of a welded-on flange 36. Individual flanges are used for each tube 34, but a single flange extending across the head 20 may also be used. Two fasteners 38 hold each flange to the head 20. The first pair of tubes 34 combine together at a first junction 42, and the second pair of tubes 34 combine together at a second junction 44, and the resulting pair of pipes finally combine together into a collector 40. The collector 40 directs the flow of exhaust gases in a forward direction on the automobile 12. This configuration is commonly known to those skilled in the art as the "tri-Y" configuration that is commercially available from a number of manufacturers of tubular headers. It is to be understood that other header configurations, such as a 4-into-1, may also be used without departing from the spirit and scope of the invention. In the preferred embodiment, the tubes 34 have a one-and-three-fourth-inch outside diameter and are each 32 inches long. The collector 40 is preferably three inches in diameter and may be anywhere from four to seven inches long, depending on the application.

The exhaust pipe 26 on each side of the engine 12 is connected at a first end to the collector 40 on each header 24. This connection may be made by welding or by bolting a flange 46 formed on the exhaust pipe 26 to a flange 48 formed on the collector 40. The exhaust pipe 26 extends first in a forward direction over the articulated axles 18, and then curves down and around the axles 18 to direct the flow of exhaust gases in a rearward direction. The curvature of the exhaust pipe 26 is at least 180° and, as shown in FIG. 1 is slightly greater than 180° to tilt slightly upward in the rearward direction. Ideally, the exhaust pipe has a two-and-one-half-inch diameter throughout its entire length. The exhaust pipe 26 should be formed to have sufficient clearance to allow the articulated axles 18 to move up and down without contacting the exhaust pipe 26. To avoid contact between the axles 18 and the exhaust pipes 26, the exhaust pipes 26 should be installed as close as possible to the transaxle 16 in a lateral direction where the range of vertical movement of the axles 18 is at a minimum.

The second end of the exhaust pipe 26 is connected by flange 48 to the Y connector 28. The Y connector 28 has two branches 50 and 52 that are each connected, preferably by welding, to a single muffler of the pair of mufflers 30. Ideally, the mufflers 30 are low-restriction, reverse-flow mufflers manufactured for the Cadillac automobile produced by General Motors in Detroit, Mich. Each muffler has connector pipes of a preferable diameter of two and one-half inches.

Projecting from the rearward end 54 of each muffler 30 are the tailpipes 32, which are coupled to the muffler connector pipes. The tailpipes 32 have a preferable diameter of two and one-half inches. The tailpipes 32 ensure that exhaust gases are directed to the outside and away from the car.

As shown more clearly in FIG. 2, a balance tube 56 is connected between the two exhaust pipes 26 to pass transversely below the engine 14. The balance tube 56 is preferably connected immediately adjacent the Y connector 28. In order to position the balance tube 56 and exhaust pipes 26 higher above the ground level, the oil pan 22 is modified to have a relieved portion 58 formed therein through which the balance tube 56 can pass. The relieved portion 58 is formed by cutting away the rear corner portion of the oil pan 22 and welding on a backplate 60 that curves up and forward to provide clearance for the balance tube 56. This permits location of the balance tube ahead of the transaxle 16 to avoid interference with transaxle connectors, adjusting mechanisms, and linkage rods. Ideally, the balance tube 56 has a two-and-one-half-inch diameter.

Although a preferred embodiment of the invention has been illustrated and described, it is to be understood that various changes can be made therein without departing from the spirit and scope of the invention as found in the appended claims. For instance, the headers 24 can be modified to accommodate a V-6 engine, an in-line or V configuration six-cylinder engine, or an eight-cylinder engine formed of four opposing cylinders.

The embodiments of the invention in which an exclusive property or privilege is claimed are defined as follows:

1. A low-restriction exhaust system for a rear-engine automobile having a rearward facing engine coupled to a transaxle, the exhaust system comprising:
   (a) at least one exhaust manifold adapted to be mounted on the engine and configured to direct engine exhaust gases toward the front of the automobile;
   (b) at least one exhaust pipe coupled at one end to said at least one exhaust manifold, said at least one exhaust pipe extending in a forward direction over said transaxle to curve around said transaxle and extend in a rearward direction; and
   (c) at least one muffler coupled to the other end of each of said one or more exhaust pipe for silencing exhaust noises.

2. The exhaust system of claim 1, wherein each of said exhaust manifold is formed of lightweight tubes to provide a low-restriction path for the flow of exhaust gases.

3. The exhaust system of claim 2, wherein each of said muffler is a reverse-flow low-restriction muffler.

4. A low-restriction, balanced dual-exhaust system for a rear-engine automobile having a rearward-facing V-8 engine adapted to be coupled to a transaxle, the V-8 engine having two banks of exhaust ports, the exhaust system comprising:
   (a) a first exhaust manifold adapted to be mounted to the V-8 engine over one bank of exhaust ports and configured to direct the flow of exhaust gases in a forward direction;
   (b) a second exhaust manifold adapted to be mounted to the V-8 engine over the other bank of exhaust ports and configured to direct the flow of exhaust gases in a forward direction;
   (c) a first exhaust pipe coupled at one end to said first exhaust manifold, said first exhaust pipe extending in a forward direction from said first exhaust manifold and over the transaxle, said first exhaust pipe then curving around the transaxle to extend in a rearward direction;
   (d) a second exhaust pipe coupled at one end to said second exhaust manifold, said second exhaust pipe extending forward from second exhaust manifold and over the transaxle, said second exhaust pipe then curving around the transaxle to extend in a rearward direction;
   (e) means for muffling exhaust gas noises as exhaust gases exit said first and second exhaust pipes; and,
   (f) a balance tube connected between said first and said second exhaust pipes.

5. The exhaust system of claim 4, wherein said muffling means comprises a pair of reverse-flow mufflers connected to each of said first and second exhaust pipes.

6. The exhaust system of claim 5, wherein said balance tube is located immediately adjacent said mufflers and passes transversely below an oil pan attached to the engine.

7. The exhaust system of claim 5, further comprising a relieved portion formed in an oil pan attached to the V-8 engine such that the balance tube extends below the V-8 engine through the relieved portion formed in the oil pan.

8. The exhaust system of claim 7, wherein said first and second exhaust pipes have a radius of curvature of at least 180° around the transaxle.

9. In an exhaust system for an automobile having a rearward-facing V-8 engine coupled to a transaxle, the V-8 engine having an oil pan attached to the bottom thereof, the improvement comprising:
   (a) a pair of low-restriction tubular exhaust manifolds mounted on the V-8 engine to exhaust burnt gases to a forward-facing collector on each of said tubular exhaust manifolds;
   (b) a first exhaust pipe coupled at one end to the collector of the first of said pair of tubular exhaust manifolds, said first exhaust pipe configured to first extend forward over the transaxle, and then curve around the transaxle to extend rearward and be coupled at the other end to one or more low-restriction mufflers; and,
   (c) a second exhaust pipe coupled at one end to the collector of the second of said pair of tubular exhaust manifolds, said second exhaust pipe configured to first extend forward over the transaxle and then curve around the transaxle and extend rearward to be coupled at the other end to one or more low-restriction mufflers;
   (d) a balance tube connected between said first exhaust pipe and said second exhaust pipe; and
   (e) a relieved portion formed in the oil pan on the V-8 engine through which the balance tube extends.

* * * * *